(12) United States Patent
Anderson et al.

(10) Patent No.: US 9,973,114 B2
(45) Date of Patent: May 15, 2018

(54) METHOD AND APPARATUS FOR CONTROLLING MOTION IN A COUNTERBALANCING SYSTEM

(71) Applicant: Magnetek, Inc., Menomonee Falls, WI (US)

(72) Inventors: Garry Anderson, Irchester (GB); Mark Kobiske, Hartland, WI (US); John Backman, Cedarburg, WI (US); Edward G. Butte, Okauchee, WI (US)

(73) Assignee: Magnetek, Inc., Menomonee Falls, WI (US)

( * ) Notice: Subject to any disclaimer, the term of this patent is extended or adjusted under 35 U.S.C. 154(b) by 0 days. days.

(21) Appl. No.: 15/418,118

(22) Filed: Jan. 27, 2017

(65) Prior Publication Data
US 2017/0222577 A1   Aug. 3, 2017

Related U.S. Application Data

(60) Provisional application No. 62/288,776, filed on Jan. 29, 2016.

(51) Int. Cl.
| | |
|---|---|
| *H02K 7/10* | (2006.01) |
| *H02K 17/32* | (2006.01) |
| *H02K 23/68* | (2006.01) |
| *H02P 1/02* | (2006.01) |
| *B66B 1/30* | (2006.01) |

(52) U.S. Cl.
CPC .............. *H02P 1/028* (2013.01); *B66B 1/304* (2013.01); *B66B 2201/34* (2013.01)

(58) Field of Classification Search
CPC ...................................................... H02P 1/028
USPC .......................................................... 318/372
See application file for complete search history.

(56) References Cited

U.S. PATENT DOCUMENTS

| | | | |
|---|---|---|---|
| 5,025,896 A * | 6/1991 | Arabori | ..................... B66B 1/28 187/292 |
| 5,076,399 A | 12/1991 | Horbruegger et al. | |
| 5,077,508 A | 12/1991 | Wycoff et al. | |
| 5,424,498 A | 6/1995 | Spielbauer et al. | |
| 5,734,135 A | 3/1998 | Hakala et al. | |
| 6,050,368 A | 4/2000 | Pakarinen et al. | |
| 6,401,873 B1 | 6/2002 | Mustalahti et al. | |
| 6,488,128 B1 | 12/2002 | Slabinski | |
| 6,566,830 B2 | 5/2003 | Walter | |
| 7,902,689 B2 | 8/2011 | Stolt et al. | |
| 8,365,873 B2 | 2/2013 | Viita-Aho et al. | |
| 2013/0146397 A1 | 6/2013 | Lee | |

* cited by examiner

*Primary Examiner* — Erick Glass
(74) *Attorney, Agent, or Firm* — Boyle Fredrickson, SC

(57) ABSTRACT

A method and system for reducing rollback in a counterbalancing system as a holding brake is released is disclosed. A limited amount of movement of a drive shaft is present in the holding brake. A motor drive provides current to the motor with the holding brake set such that a torque is applied at the drive shaft. The current is controlled to generate torque in both directions. The limited amount of movement in the brake may be used to determine a direction and magnitude of torque required to support a mechanical load being applied to the motor. The motor drive then provides a current to generate the necessary torque required to support the load prior to releasing the holding brake.

20 Claims, 7 Drawing Sheets

METHOD AND APPARATUS FOR CONTROLLING MOTION IN A COUNTERBALANCING SYSTEM

CROSS-REFERENCE TO RELATED APPLICATIONS

This application claims priority to U.S. provisional application Ser. No. 62/288,776, filed Jan. 29, 2016 and titled Method and Apparatus for Controlling Motion in a Counterbalancing System, the entire contents of which is incorporated herein by reference.

BACKGROUND OF THE INVENTION

The subject matter disclosed herein relates to a method and apparatus for controlling motion in a counterbalancing system and, more specifically, to a method and apparatus for determining a pre-torque direction during brake engagement and applying a pre-torque in the pre-torque direction prior to brake disengagement.

Elevators are typically implemented as counterbalancing systems. Accordingly, cables (or ropes) are often provided around a sheave (a grooved spindle or pulley), mounted to the top of an elevator cab in order to raise or lower the cab within an elevator shaft. A first end of the cables may be mounted to a first point at the top of the shaft and routed down and around a sheave mounted to the top of the cab. The cables may then be routed over a sheave mounted to an electric motor with a drive shaft there between. The cables may then continue around one or more sheaves mounted to a counterweight, then back to a second point at the top of the shaft. Use of the counterweight provides counterbalancing with the cab which may permit the motor to lift a differential weight between the counterweight and the cab (as opposed to the entire weight of the cab). Various configurations of cables, sheaves, and cable routing may be utilized.

To ease strain on the motor and provide further safety in the system, a brake is also typically used in conjunction with the motor. In such systems, when it is desired to remain stationary, the motor is typically enabled for zero speed, and while the motor is still enabled, the brake is enabled, and then the motor may be subsequently disabled while the brake is engaged to hold the sheave, cables, cab and counterweight stationary. Then, to resume motion, such as upon a call for the elevator to move to another floor, the motor is enabled for zero speed, then the brake is disengaged (or picked), then the motor continues to move the cab accordingly.

However, in certain circumstances which may depend on the system configurations and weights involved, the period between disengagement of the brake and activation of the motor may cause a brief rollback of the elevator cab (or of the counterweight). Moreover, this crossover period may also cause auditory noises and/or noticeable vibrations when the motor must quickly catch the car in an attempt to keep it stationary. These conditions may cause uneasiness for occupants of an elevator cab and/or disturbances for building occupants nearby and are therefore undesirable. What is needed is an improved counterbalancing system in which one or more of the aforementioned drawbacks may be minimized in such circumstances.

BRIEF DESCRIPTION OF THE INVENTION

The present inventors have recognized that certain braking systems, when used in a counterbalancing system, still allow a limited amount of movement in a direction opposite the direction that the sheave is being pulled. This limited amount of movement may allow for determining the direction that the sheave is being pulled by activating an electric motor, with the brake engaged, to apply torques in opposing directions. There will be no movement in the direction that the sheave is being pulled, but there will be a limited amount of movement measurable in a direction opposite the direction that the sheave is being pulled due to backlash. The limited amount of movement may be detected by an encoder, and the motor may then pre-apply a correct torque in the direction opposite the direction that the sheave is being pulled before releasing the brake to allow for a smoother transition.

In one aspect, in a counterbalanced lifting device, such as an elevator, loads may vary with each ride or operation in either the ascending or descending direction based on the number of passengers in any given run. With many lightweight elevator cars used in lower cost applications, attempting to catch the car using normal anti-rollback algorithms may result in an audible bang. A motion controlling inverter may be provided with a proper level of pre-torque applied in the correct direction to provide a smooth, quieter, and more consistent start to a run, while interfacing with machine brakes and elevator controllers to hold a position until it is safe start movement. External load weighing devices may be eliminated in favor of techniques of the present invention, thereby reducing the cost of installation and/or calibration of such devices. Accordingly, aspects of the invention may provide the ability to determine both direction and magnitude of a lifting device without external weight measuring devices.

In one aspect, primary motion for the counterbalanced lifting device, such as an elevator, may be provided by a system with an electrical motor and a sheave. Wire cables in grooves of the sheave may be connected to the passenger car at one end and a counterbalance at the other end. For safety, mechanical brakes may be mounted to the motor shaft or sheave. One or more brake disks may be splined onto a rotor shaft opposite the sheave. Such mechanical connection may provide for a small degree of movement between the rotor shaft and the brake which can be used while the brake is still holding the load to sense an offset in the load. Any motion on the machine shaft may be detected by one or more encoders which may be mechanically connected to the rotor. The brake may remain fixed while the machine is driven or controlled by an AC or DC drive, and the motion sensing encoder may be fed back to the AC or DC drive as a reference device for proper speed and position control.

When a lifting device is engaged for motion, a fixed amount of weight may be established for the individual run or motion profile. At this point the drive may be made ready to operate or enabled. Between a time when an enable signal is commanded by the elevator car controller and the brake is released to begin motion, a pre-torque direction and magnitude may be determined. This may be done so that the loading that is being held by the brake may be transferred to the rotor before the brake is released, thereby resulting in a smooth transition.

When the drive is turned on, gates and internal control may be active. A pulsed torque may be applied from the rotor prior to releasing the brake to sense any slight movement via the encoder feedback. An increasing level of torque may be applied to the rotor in the positive then the negative direction while monitoring for movement. If there is backlash between the rotor shaft and the brake, such that beyond a torque level the backlash is taken up and motion is sensed, then that may be the level that is maintained to hold the offset load when the brake is subsequently released. This may be done in both directions as the load offset could be in either. The application of torque before the brake is released may take up a load offset and avoid an audible and/or vibrational transient which may ordinarily occur. In other words, a sheave and rotor may be pulled one way by a load, and a small movement may be sensed if the rotor produces a torque higher but in the opposite direction to the load just as the rotor produced torque overcomes the load torque.

Moreover, varying a magnitude of the pre-torque pulse may allow for determining a magnitude for the pre-torque command in addition to a direction. With both direction and magnitude, the operation of the counterbalancing system can begin while providing a smooth start.

According to one embodiment of the invention, a method of determining a desired pretorque level for a motor controlling motion in a counterbalancing system is disclosed. The motor has a holding brake operatively connected to a drive shaft of the motor. A magnitude of current applied to the motor is increased to generate torque in a first direction of rotation while the holding brake is set, and a position feedback signal corresponding to rotation of the motor while the torque is generated in the first direction is monitored. The current applied to the motor to generate torque in the first direction of rotation is removed, and an increasing magnitude of current is applied to the motor to generate torque in a second direction of rotation while the holding brake is set. The position feedback signal corresponding to rotation of the motor while the torque is generated in the second direction is monitored. The current applied to the motor to generate torque in the second direction of rotation is removed, and the desired pretorque level is determined as a function of the magnitude of current applied to the motor and a magnitude of rotation detected by the position feedback signal.

According to another aspect of the invention, the step of determining the desired pretorque level may include comparing a change in the position feedback signal to a first threshold, and setting the desired pretorque level equal to the magnitude of current applied to the motor when the change in the position feedback signal reaches the first threshold. Optionally, the step of determining the desired pretorque level may include comparing a change in the position feedback signal to a first threshold, monitoring the position feedback signal until the change in the position feedback signal drops back below the first threshold when the change in the position feedback signal exceeds the first threshold, and setting the desired pretorque level equal to the magnitude of current applied to the motor when the change in the position feedback signal drops back below the first threshold when the change in the position feedback signal drops back below the first threshold.

According to another embodiment of the invention, a system for determining a desired pretorque level for a motor controlling motion in a counterbalancing system is disclosed. The motor has a holding brake operatively connected to a drive shaft of the motor. The system includes a power converter, a position feedback device, and a controller. The power converter is operatively connected to the motor to supply a variable voltage and a variable current to the motor for controlling operation of the motor. The position feedback device is operatively connected to the motor and configured to generate a signal corresponding to an angular position of the motor. The controller includes an input operative to receive the signal from the position feedback device, a memory device operative to store a plurality of instructions, and a processor operative to execute the plurality of instructions. The processor executes the instructions to control operation of the power converter to provide an increasing magnitude of current to the motor with a first polarity and to monitor the signal from the position feedback device while the increasing magnitude of current with the first polarity is being provided to the motor, where the current increases from a first level to a second level and generates a torque in the motor in a first direction of rotation. The processor further executes to control operation of the power converter to provide a decreasing magnitude of current with the first polarity to the motor, where the current decreases from the second level to the first level. The power converter provides an increasing magnitude of current to the motor with a second polarity and monitors the signal from the position feedback device while the increasing magnitude of current with the second polarity is being provided to the motor, where the current increases from the first level to a third level, the second polarity is opposite the first polarity, and the current generates a torque in the motor in a second direction of rotation. The power converter provides a decreasing magnitude of current with the second polarity to the motor, where the current decreases from the third level to the first level, and determines the desired pretorque level as a function of the magnitude of current applied to the motor and a magnitude of rotation detected by the position feedback signal.

According to another aspect of the invention, the system may include a motor drive, where the power converter is a power conversion section of the motor drive and the controller is a control section of the motor drive. The desired pretorque level may be determined as a function of the magnitude of current applied to the motor as the current is increasing in magnitude or as the current is decreasing in magnitude. The processor may compare a change in the signal from the position feedback device to a first threshold. The processor may set the desired pretorque level equal to the magnitude of current applied to the motor when the change in the signal from the position feedback device reaches the first threshold. Optionally, the processor may monitor the signal from the position feedback device until the change in the signal drops back below the first threshold when the change in the signal from the position feedback device exceeds the first threshold, and when the change in the signal from the position feedback device drops back below the first threshold, set the desired pretorque level equal to the magnitude of current applied to the motor when the change in the signal from the position feedback device drops back below the first threshold.

According to still another embodiment of the invention, a method of reducing rollback for a motor controlling motion in a counterbalancing system is disclosed. The motor has a holding brake operatively connected to a drive shaft of the motor, and the rollback occurring when the brake is opened. The initial steps are performed with the holding brake set. The motor applies a first torque is applied to the drive shaft in a first direction, and a position feedback signal corresponding to rotation of the drive shaft while the first torque is being applied is monitored. The motor applies a second torque to the drive shaft in a second direction, and the position feedback signal corresponding to rotation of the drive shaft while the second torque is being applied is monitored. A magnitude and direction of a desired pretorque level is determined as a function of the applied first and second torque and of the position feedback signal. The motor applies a torque at the desired pretorque level to the drive shaft and the holding brake is released.

According to still another aspect of the invention, a motor drive supplies a variable voltage and a variable current to the motor to apply each torque to the drive shaft, and the motor drive receives the position feedback signal and generates a control signal to release the holding brake. The step of activating the motor to apply the first torque may include the steps of incrementally changing a magnitude of current applied to the motor to generate the first torque from a first level to a second level, and removing the current applied to the motor to generate the first torque. The step of activating the motor to apply the second torque may include the steps of incrementally changing a magnitude of current applied to the motor to generate the second torque from a third level to a fourth level, and removing the current applied to the motor to generate the second torque. The desired pretorque level may be determined as a function of the magnitude of current applied to the drive shaft.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWING(S)

Various exemplary embodiments of the subject matter disclosed herein are illustrated in the accompanying drawings in which like reference numerals represent like parts throughout, and in which.

Figure 1:
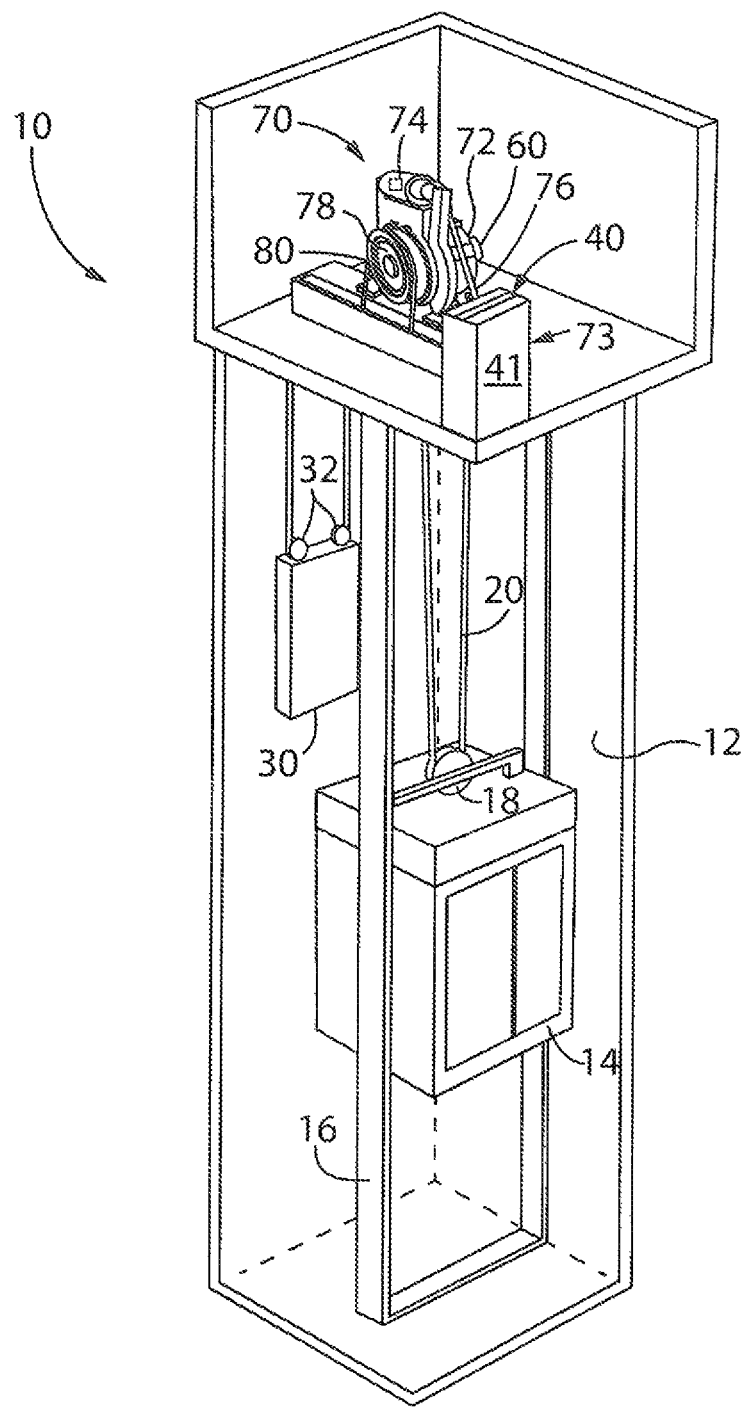
FIG. 1 is an exemplary counterbalancing system implemented by an elevator and a counterweight in which the system provides an electrical motor, a brake, an encoder and a controller for implementing a smooth brake to drive transition in accordance with an embodiment of the invention.
Figure 3:
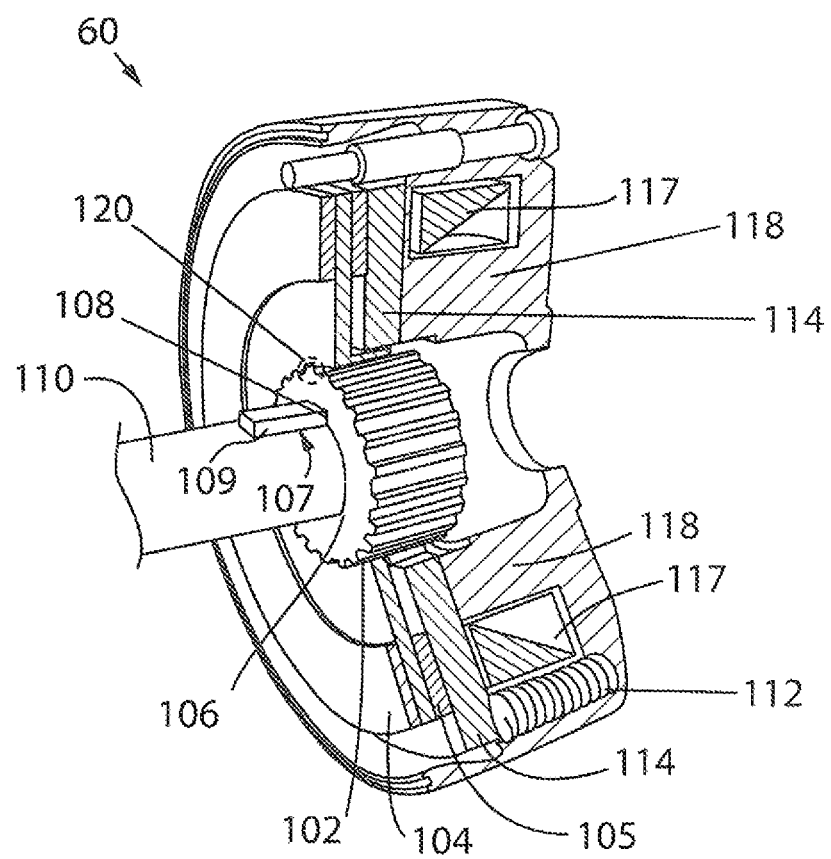
FIG. 3 is a partial cutaway view of an exemplary brake which may be used in the system of FIG. 1 which includes a toothed hub and a grooved rotor in which engagement of the toothed hub with the grooved rotor may provide a brake in the system.
Figure 5:
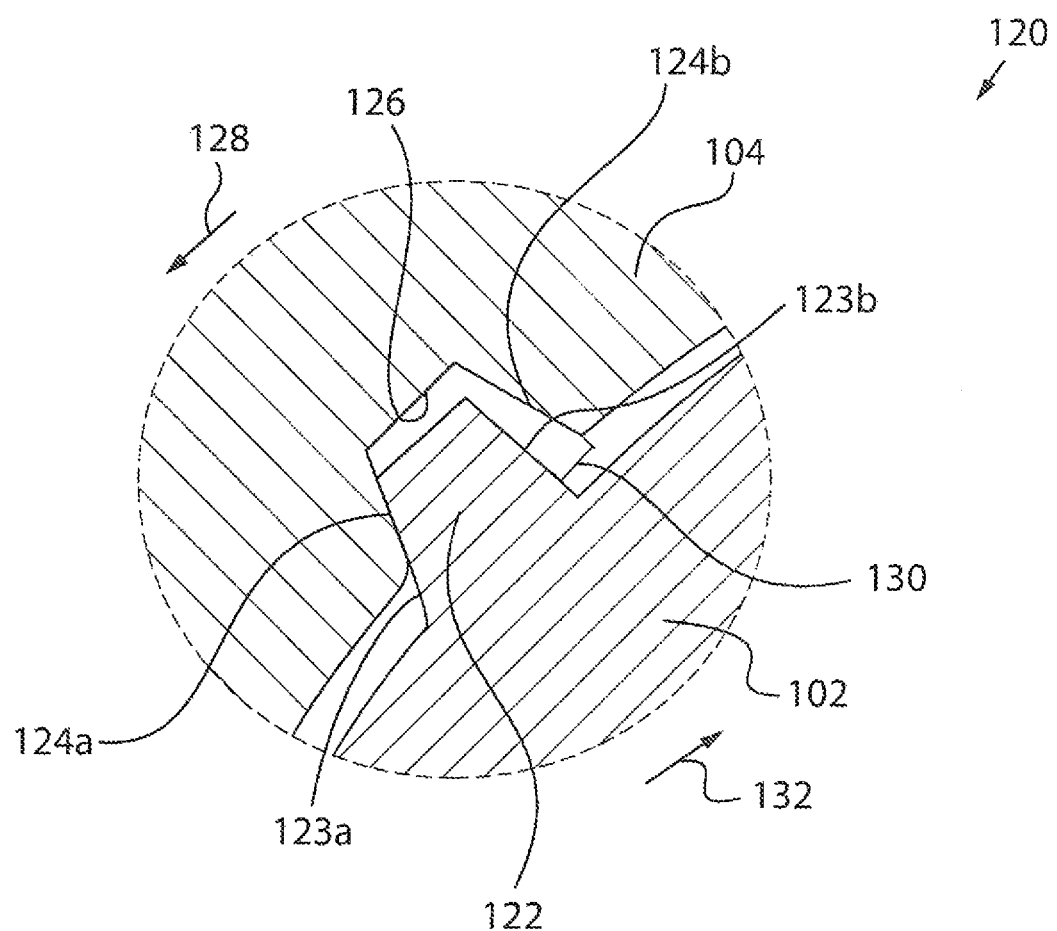
Figure 6A:
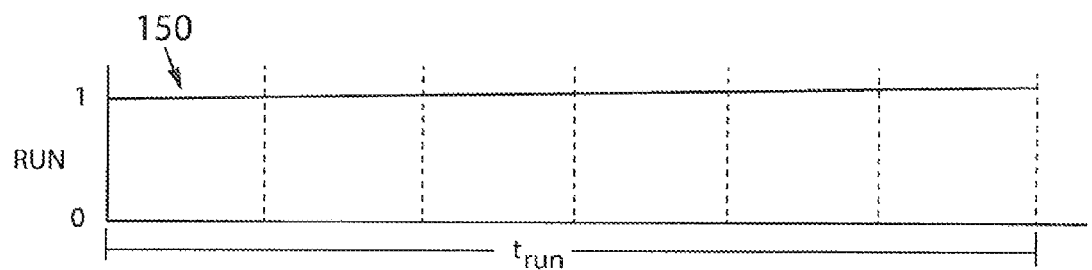
Figure 6B:
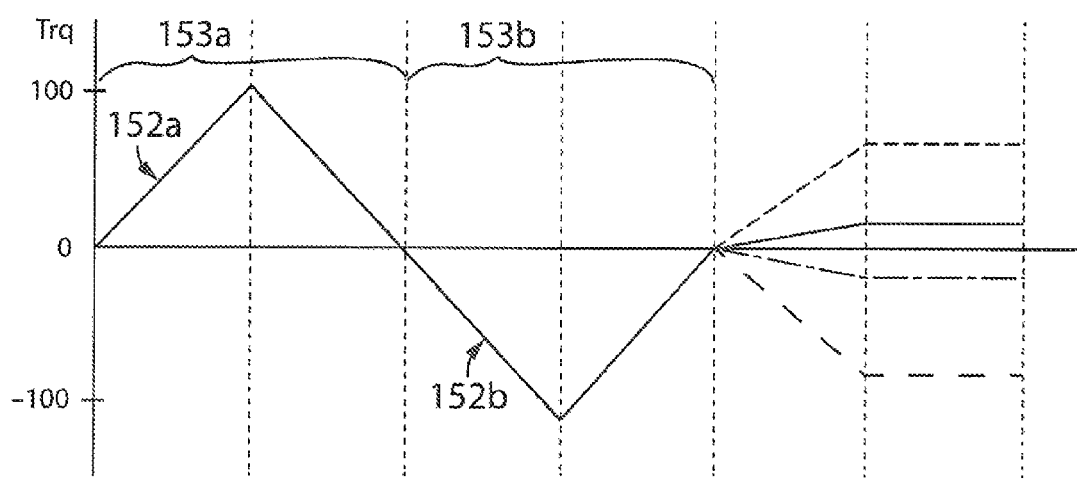
Figure 6C:
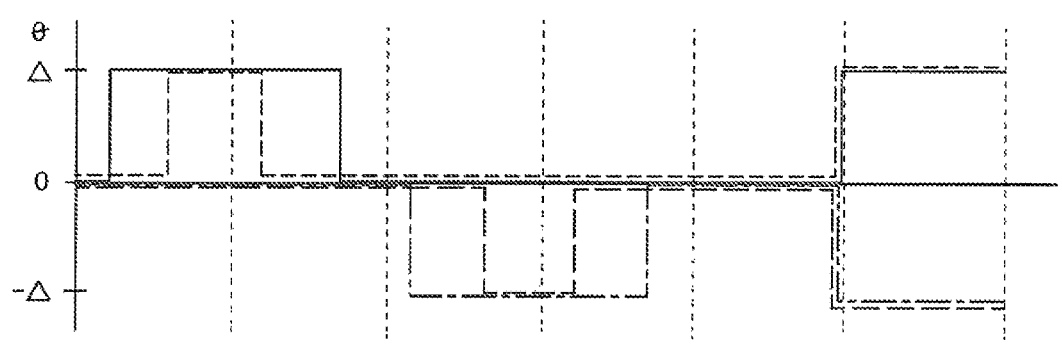
Figure 6D:
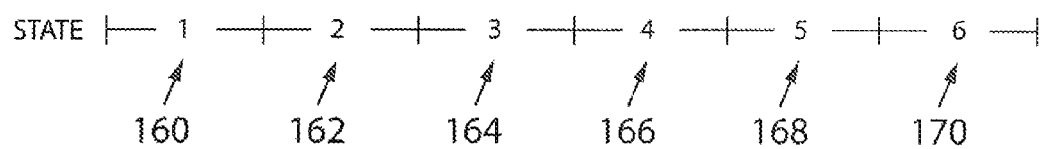
Figure 7:
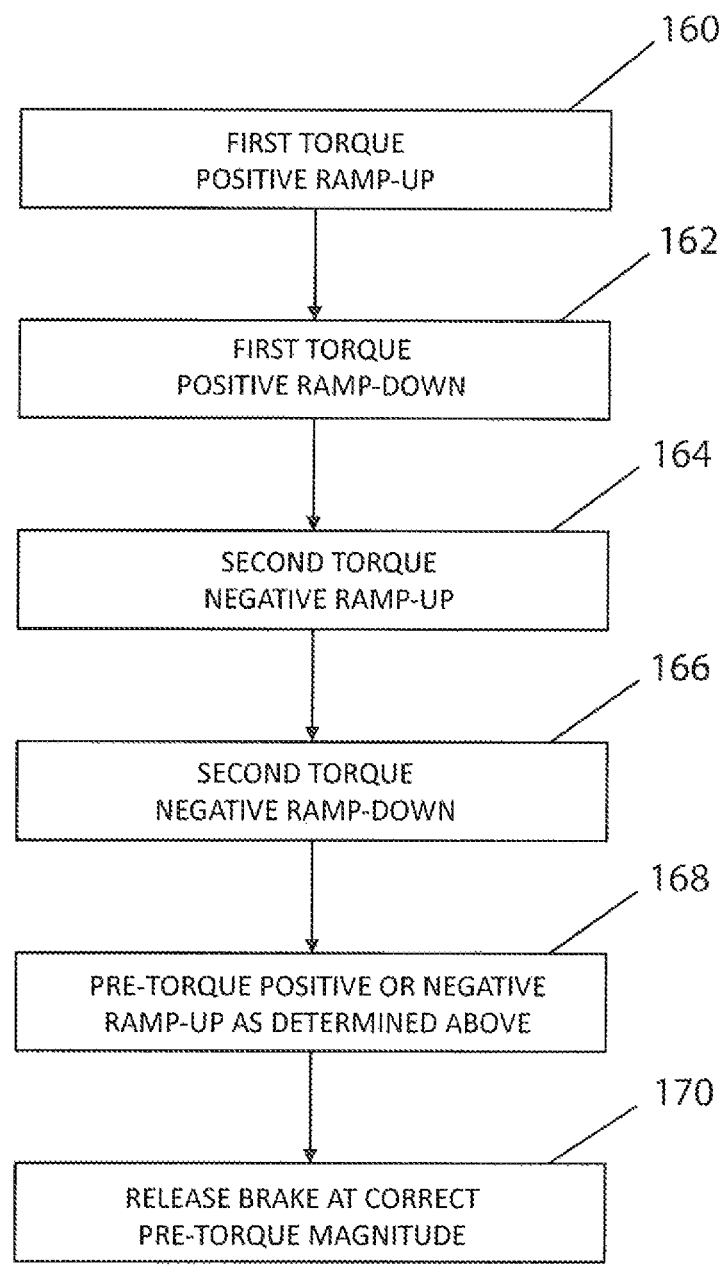
Figure 8:
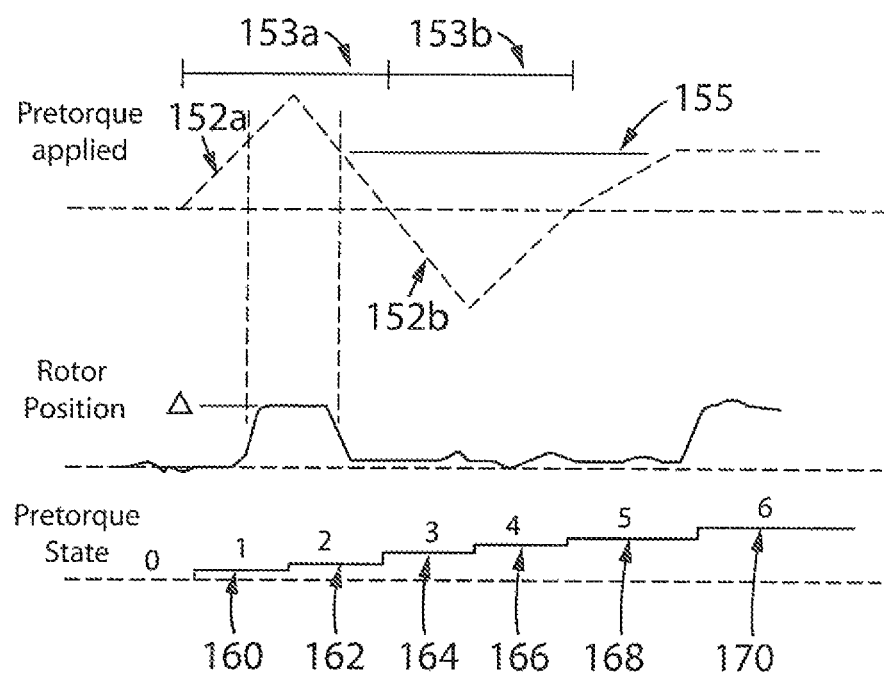

FIG. 5 is a detailed view of engagement of a sequence of activating the motor 70 to determine a magnitude and direction of load applied to the motor 70 with the brake 60 engaged the toothed hub with the grooved rotor of the exemplary brake in FIG. 3;

FIG. 6a is a timing diagram corresponding to FIGS. 6b, 6c, and 6d illustrating the current state of the motor during a sequence of activating the motor to determine a magnitude and direction of a desired pretorque to apply to the motor prior to opening the brake according to one embodiment of the invention;

FIG. 6b is a timing diagram corresponding to FIGS. 6a, 6c, and 6d illustrating a magnitude and direction of torque applied to the motor during the sequence of FIG. 6a;

FIG. 6c is a timing diagram corresponding to FIGS. 6a, 6b, and 6d illustrating rotational movement of the motor shaft during the sequence of FIG. 6a;

FIG. 6d is a timing diagram corresponding to FIGS. 6a, 6b, and 6c illustrating a position feedback signal corresponding to rotation of the motor shaft during the sequence of FIG. 6a;

FIG. 7 is a flow chart illustrating the process flow between states of FIG. 6; and FIG. 8 is an exemplar state and timing diagram illustrating activation of the motor of FIG. 1.

In describing the preferred embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

The various features and advantageous details of the subject matter disclosed herein are explained more fully with reference to the non-limiting embodiments described in detail in the following description.

Turning initially to FIG. 1, an exemplary counterbalancing system, which may be implemented by an exemplary elevator system 10, is provided in accordance with an embodiment of the invention. A shaft 12 includes a cab 14 configured to move up and down the shaft 12. The cab 14 includes, for example, wheels configured to engage rails 16 extending vertically along each side of the shaft 12 to maintain horizontal alignment of the cab 14 within the shaft 12. Cables 20 extending around one or more cab sheaves 18 (a grooved spindle or pulley) mounted to the top of the cab 14 may be used to raise or lower the cab 14 within the shaft 12. According to the illustrated embodiment, a first end of the cables 20 are fixedly mounted to a first point at the top of the shaft 12 and routed down and around the cab sheave 18 mounted to the top of the cab 14. The cables 20 are then routed over one or more drive sheaves 78 mounted to an electrical motor 70. The cables 20 continue around one or more counterweight sheaves 32 mounted to a counterweight 30 and back to a second point at the top of the shaft 12. It is contemplated that various other configurations of cables, sheaves, and cable routing may be utilized according to the application requirements without deviating from the scope of the invention.

According to the illustrated embodiment, the motor 70 may be mounted in a machine room located above the elevator shaft 12. Optionally, the motor 70 may be mounted in the elevator shaft 12. A brake 60, is operatively connected to the motor 70 to provide braking in the system, and an encoder 80 is operatively connected to the motor 70 to provide a feedback signal corresponding to an angular position of the motor 70. According to the illustrated embodiment, a control cabinet 41 is provided in the machine room. The control cabinet 41 may include a motor drive 40 to control operation of the motor and a separate controller 73 providing instructions to the motor drive 40. A junction box 74 may be mounted to the top of a housing 72 of the motor 70, and electrical conductors 76 may run between the control cabinet 41 and the junction box 74, the motor 70, the brake 60, and the encoder 80 to connect the motor drive 40 and the controller 73 with the motor, brake, and encoder. The electrical conductors 76 may conduct electrical power and control signals to or feedback signals from the motor 70, the brake 60 and encoder 80 as will be further described.

Figure 2:
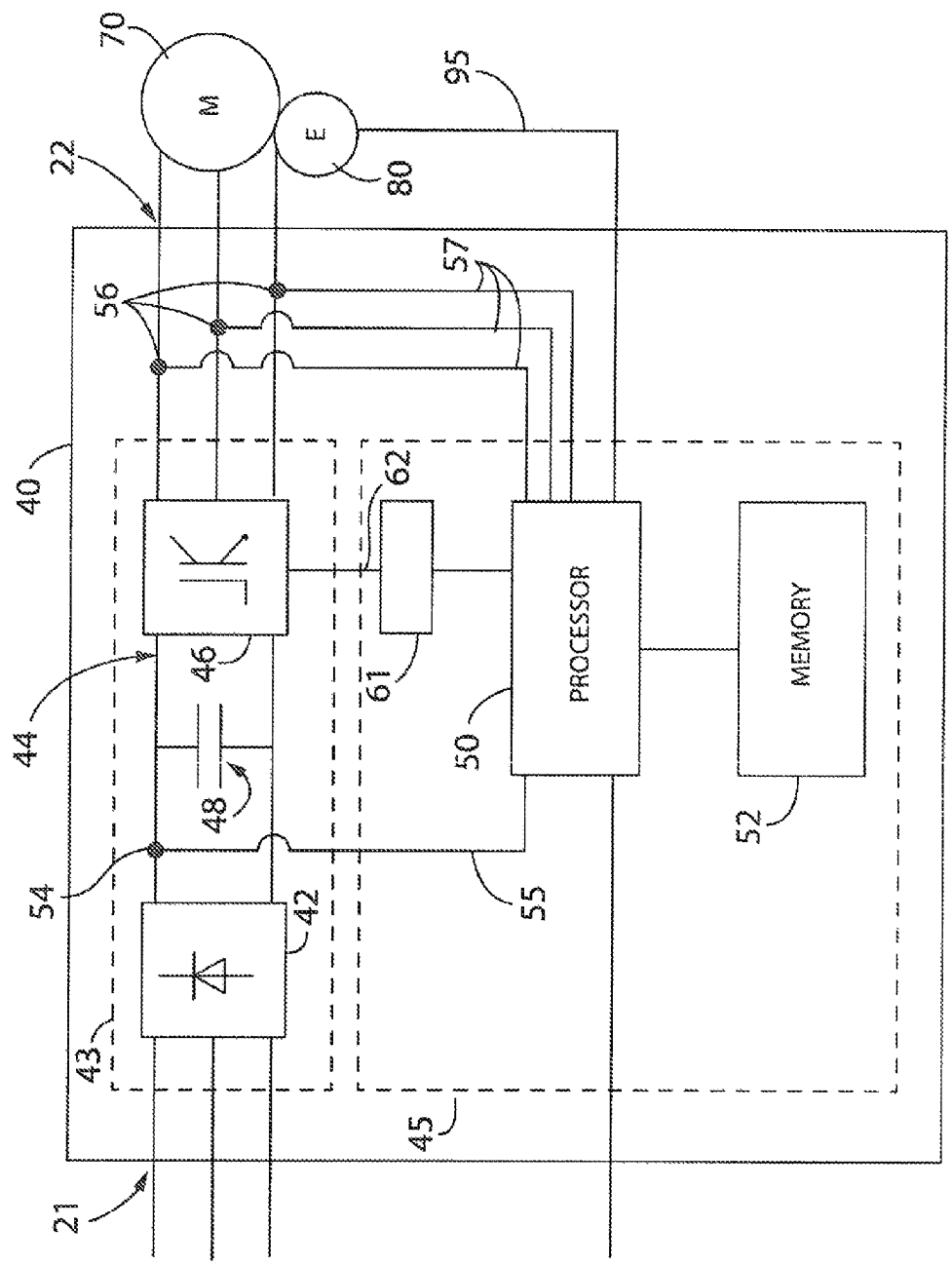
FIG. 2 is a block diagram representation of a motor drive operative to control the electrical motor of FIG. 1.

Referring also to FIG. 2, the motor drive 40 includes a power conversion section 43 and a control section 45. The power conversion section 43 converts the input power 21 to the desired voltage at the output 22. According to the illustrated embodiment, the power conversion section 43 includes a rectifier section 42 and an inverter section 46, converting a fixed AC input 21 to a variable amplitude and variable frequency AC output 22. Optionally, other configurations of the power conversion section 43 may be included according to the application requirements. The rectifier section 42 is electrically connected to the power input 21. The rectifier section 42 may be either passive, such as a diode bridge, or active, including controlled power electronic devices such as transistors. The rectifier section 42 converts the AC voltage input 21 to a DC voltage present on a DC bus 44. The DC bus 44 may include a bus capacitance 48 connected across the DC bus 44 to smooth the level of the DC voltage present on the DC bus 44. As is known in the art, the bus capacitance 48 may include a single or multiple capacitors arranged in serial, parallel, or a combination thereof according to the power ratings of the motor drive 40. An inverter section 46 converts the DC voltage on the DC bus 44 to the desired voltage at the output 22 for the motor 70 according to switching signals 62.

The control section 45 receives a command signal, feedback signals and generates the switching signals 62 responsive to the command and feedback signals to achieve desired operation of the motor 70. The control section 45 includes a processor 50 connected to a memory device 52. It is contemplated that the processor 50 may be a single processor or multiple processors operating in tandem. It is further contemplated that the processor 50 may be implemented in part or in whole on a field programmable gate array (FPGA), an application specific integrated circuit (ASIC), a logic circuit, or a combination thereof. The memory device 52 may be a single or multiple electronic devices, including static memory, dynamic memory, transitory memory, non-transitory memory, or a combination thereof. The memory device 52 preferably stores parameters of the motor drive 40 and one or more programs, which include instructions executable on the processor 50. A parameter table may include an identifier and a value for each of the parameters. The parameters may, for example, configure operation of the motor drive 40 or store data for later use by the motor drive 40.

A motor control module may be stored in the memory 52 for execution by the processor 50 to control operation of the motor 70. The processor 50 receives feedback signals, 55 and 57, from sensors, 54 and 56 respectively. The sensors, 54 and 56, may include one or more sensors generating signals, 55 and 57, corresponding to the amplitude of voltage and/or current present at the DC bus 44 or at the output 22 of the motor drive 40 respectively. The processor 50 also receives a position feedback signal 95 from the position sensor 80, such as an encoder or resolver, mounted to the motor 70. The switching signals 62 may be determined by an application specific integrated circuit 61 receiving reference signals from a processor 50 or, optionally, directly by the processor 50 executing the stored instructions. The switching signals 62 are generated, for example, as a function of the feedback signals, 55, 57, and 95, received at the processor 50.

The controller 73 in the control cabinet 41 may similarly include a processor and a memory device. It is contemplated that the processor for the controller 73 may be a single processor or multiple processors operating in tandem. It is further contemplated that the processor for the controller 73 may be implemented in part or in whole on a field programmable gate array (FPGA), an application specific integrated circuit (ASIC), a logic circuit, or a combination thereof. The memory device for the controller 73 may be a single or multiple electronic devices, including static memory, dynamic memory, transitory memory, non-transitory memory, or a combination thereof. The memory device for the controller preferably stores parameters for operation of the elevator 10 and one or more programs, which include instructions executable on the processor for the controller 73.

It is contemplated that a portion of the method for controlling motion of the counterbalancing system as described herein may be implemented in whole or in part in the processor 50 of the motor drive 40, the controller 73, or a combination thereof. For ease of discussion, the method will be discussed as being implemented on the processor 50 of the motor drive 40.

Figure 4:
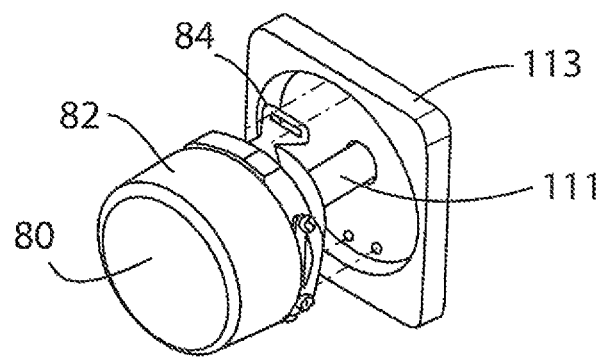
FIG. 4 is a partial isometric view of an exemplary encoder which may be used in the system of FIG. 1.

Referring next to FIG. 4, a partial isometric view of an exemplary encoder which may be used in the system of FIG. 1 is provided in accordance with an embodiment of the invention. An encoder 80 may be coupled to a rotor or to a drive shaft 111, which is, in turn coupled to the rotor. A mounting bracket 84 may be provided to secure a housing 82 of the encoder 80 to a mounting surface 113 provided in the system, such as a mounting surface 113 proximal to the drive sheave 78. The encoder 80 may be, for example, a high resolution shaft mounted encoder, such as an EnDat interface bidirectional rotary encoder available from Heidenhain GmbH of Germany. The encoder 80 includes a transducer in communication with the drive shaft 111 to convert the rotary motion of the drive shaft 111 into an electric signal 95. The electric signal 95 may be a series of pulses, a sinusoidal waveform, or a serial data word containing the angular position information. The encoder 80 also includes an electronic circuit configured to transmit the electric signal 95 from the transducer to the motor drive 40 via an encoder cable. As a result, the encoder 80 is operative to detect motion of the rotor or drive shaft 111 by detecting an angular movement. The illustrated encoder 80 is shown by way of example. Optionally, a resolver or another position feedback device, providing a signal corresponding to an angular position of the rotor or drive shaft 111, may be utilized in place of the encoder 80. In other embodiments, additional and/or alternative encoders, resolvers, or positions sensors may be used, and in the same or alternative locations, within the scope of the invention.

Referring now to FIG. 3, a partial cutaway view of an exemplary brake 60 which may be used in the system of FIG. 1 is provided in accordance with an embodiment of the invention. The illustrated brake 60 includes a toothed hub 102 and a grooved brake rotor 104. The toothed hub 102 may have a central aperture 106 for mounting to a drive shaft 110 extending from the motor rotor. A notch 108 in the hub 102 is configured to receive a motor key 109 fit in a keyway 107 on the motor shaft 110. The hub 102 is mounted to the motor shaft 110 and the motor key 109 engages the notch 108 and the keyway 107 to prevent slippage of the hub 102 on the motor shaft 110. The grooved brake rotor 104 is then slid on to the toothed hub 102 as the brake 60 is mounted to the motor 70. The brake rotor 104 rotates with the toothed hub as it is spun during operation of the motor 70.

The brake 60 is operative in one of two states. A first, unenergized state (engagement) provides braking in the system. In the first state, one or more springs 112 press an armature disk 114 against a friction plate 105 mounted to the grooved rotor 104, thereby holding the grooved rotor 104 stationary. As a result, the friction plate 105 holds the grooved rotor 104 and, in turn, the hub 102 stationary. Thus, when the brake is unenergized, the springs 112 engage the brake 60 and hold the drive shaft 110 stationary.

A second, energized state (released) allows movement in the system. In the second state, power is provided to an electromagnetic coil 117 wound on a core 118 within the brake 60 in order to establish a magnetic field. The magnetic field is of sufficient strength to attract the armature disk 114 to the core 118 against the force resulting from compressing the spring 112. Drawing the armature disk 114 toward the core disengages the disk from the friction plate 105 on the grooved rotor 104. With the brake 60 in the released state, the grooved rotor 104 is able to rotate, which, in turn, allows the hub 102 and drive shaft 110 to rotate. In one embodiment, the brake 60 may be a "ROBA-stop-M" electromagnetic safety brake as provided by Chr. Mayr GmbH+Co. KG of Germany.

Referring now to FIG. 5, a detailed view of engagement of the toothed hub 102 with the grooved rotor 104 is provided in accordance with an embodiment of the invention. With the brake engaged in the first state, a load present on the motor, will cause the drive shaft 110 to rotate in the direction of the load to the extent allowed by the grooved rotor 104. The drive shaft 110 will rotate until one or more teeth 122 of the toothed hub 102 engage an interior surface of a groove 126 on the grooved rotor 104. The side wall 123 of each tooth 122 will be held against an interior edge 124 of one of the grooves 126. The load applied to the motor is represented by a vector force (128 or 132) having a direction and a magnitude, as applied by a load in the system 10 against the brake 60. According to the illustrated embodiment, a force in the direction of arrow 128 is being applied to the motor shaft 110 and forcing a first side wall 123a of each tooth 122 against a first interior surface 124a of the groove 126.

However, the width of each groove 126 is larger than the width of each tooth 122. As a result, when the first side wall 123a of each tooth 122 engages the first interior surface 124a of the groove 126, a gap 130 exists between a second side wall 123b of each tooth 122 and an opposing, second interior surface 124b of the groove 126. Although the grooved rotor 104 is machined to closely engage the toothed hub 102, some space exists between each groove 126 and each tooth 122, defining the gap 130 and resulting in some backlash in the system. The gap 130 provides a limited amount of rotational movement of the motor 70 in a direction opposite the direction that the load is being applied.

The gap 130, which provides this limited amount of movement, may allow for determining the direction that the brake is being pulled. This may be accomplished, for example, by activating the motor 70 when the brake 60 is still engaged, to apply a torque in the direction of the gap 130. The motor drive 40 may apply sufficient voltage and current to overcome the load present on the motor 70 and cause the hub 102 to rotate in the direction of the gap 130. The limited amount of movement may be detected by the encoder 80 and the motor drive 40 may identify the movement by monitoring the position feedback signal 95 from the encoder 80. As will be discussed in more detail below, the motor drive 40 may record the level of voltage and/or current required to cause the movement and, thereby identify a level of torque required to suspend the load present on the motor 70. The motor drive 40 may, in turn, generate the recoded levels of voltage and/or current prior to releasing the brake 60, which generates a motor vector force 132 substantially opposite to the load vector force 128, such that little or no movement is seen on the motor shaft 110 when the brake 60 is released.

Referring now to FIGS. 6a-6d, a state and timing diagram illustrating a sequence of activating the motor 70 to determine a magnitude and direction of a desired pretorque to apply to the motor 70 prior to opening the brake 60 is illustrated according to one embodiment of the invention. In the first four states, 160-166, the motor 70 is activated with the brake 60 engaged to apply torques in opposing directions. During the activation sequence, the position feedback signal 95 is monitored for movement of the motor 70. Based on the position feedback signal 95, a desired level of pretorque required to hold a load present on the motor 70 is determined. In the last two states 168, 170, the motor 70 is activated to apply a torque having a magnitude and in a direction determined to be opposite the direction of the load present on the motor 70 before releasing the brake 60, is provided.

With reference also to FIG. 7, each state illustrated in FIGS. 6A-6D will be discussed in more detail. A run command 150 is initially provided to the motor drive 40 controlling operation of the motor 70. The run command 150 is maintained for a duration, identified as $t_{run}$, in order to execute the pretorque routine. Although illustrated as returning, to zero, the run command may remain on for a duration after the pretorque duration, $t_{run}$, to control operation of the motor 70 and move the elevator cab 14 between floor.

In a first state 160 (labeled "1" in FIG. 6D), the brake 60 remains deenergized or set, thereby causing the brake to engage the motor shaft 110 and hold the motor in position. As indicated above, however, a certain amount of backlash exists in the holding brake. After receiving the run command 150 and with the brake 60 set, the motor drive 40 activates the motor 70 to ramp-up a first torque 152a applied to the drive shaft 110. Activation of the motor 70 includes providing a variable voltage and/or a variable current at the output 22 of the motor drive to achieve a desired torque on the drive shaft 110. The drive shaft is splined to the toothed hub 102 and, thereby transfers the torque generated by the motor 70 to the hub 102 of the brake 60. In the illustrated embodiment, the first torque 152a is illustrated as "ramping up" throughout the first state 160. In other words, the current output to the motor 70 is increased by the motor drive 40 in a manner that results in a linear increase of torque from zero torque at the start of the first state 160 to one hundred percent torque and the end of the first state 160. It is contemplated that various other methods of increasing the torque, such as periodic step changes or a sinusoidal increase of the torque may be utilized without deviating from the scope of the invention.

The current is generated such that the torque, Trq, increases in a first direction throughout the desired range of magnitudes. The first direction may be, for example, a "positive" or clockwise direction of rotation of the motor shaft 110. The first torque 152a may or may not produce a motion detected by the encoder depending on the force 128 or 132 applied to the hub 102 by the load present on the motor 70. Motion is detected by the position feedback signal 95 which may be, for example, encoder counts representing a motion of the rotor or drive shaft 110 with respect to the brake 60. The amount of motion is limited by the width of the gap 130 between a surface of the tooth 122 and a surface of the groove 126. This motion is indicated by the step change in angular position, θ, from zero to Delta, Δ, in FIG. 6c.

In a second state 162 (labeled "2" in FIG. 6D) the brake 60 is still applied and the motor drive 40 decreases the first torque 152a applied to the motor 70. In the illustrated embodiment, the first torque 152a is illustrated as "ramping down" throughout the second state 162. In other words, the current output to the motor 70 is decreased by the motor drive 40 in a manner that results in a linear decrease of torque from one hundred percent torque at the start of the second state 162 to zero torque and the end of the second state 162. It is contemplated that various other methods of decreasing the torque, such as periodic step changes or a sinusoidal decrease of the torque may be utilized without deviating from the scope of the invention. The first torque 152a is applied for a first duration 153a of the pretorque sequence. Although the first torque 152a is illustrated as ramping up from zero torque to one hundred percent torque and then ramping back down to zero torque, it is contemplated that various other initial and final setpoints of torque may be selected without deviating from the scope of the invention.

Similar to increasing the magnitude of torque in the first state 160, decreasing the magnitude of torque in the second state 162 may or may not produce a motion detected by the encoder 80 depending on the force 128 or 132 applied to the hub 102 by the load present on the motor 70. If motion was detected during the initial ramp in the first state 160, this indicates the torque applied was sufficient to overcome the load and that the force applied 128 or 132 was in the direction opposite of the torque applied. As a result, the torque applied during the first state caused the hub 102 to rotate such that the tooth 122 moved from one side of the groove 126 to the other. As the magnitude of torque is ramped back to zero, the force applied 128 or 132 by the load causes the hub 102 to rotate back to its initial position. This motion is detected by the position feedback signal 95 which may be, for example, encoder counts representing a motion of the rotor or drive shaft 110 with respect to the brake 60. The amount of motion is limited by the width of the gap 130 between a surface of the tooth 122 and a surface of the groove 126. This motion is indicated by the step change in angular position, θ, from Delta, Δ, back to zero in FIG. 6c.

In a third state 164 (labeled "3" in FIG. 6D), the brake 60 remains deenergized or set, thereby causing the brake to engage the motor shaft 110 and hold the motor in position. As indicated above, however, a certain amount of backlash exists in the holding brake. The motor drive 40 again activates the motor 70 to ramp-down a second torque 152b applied to the drive shaft 110. As previously indicated, activation of the motor 70 includes providing a variable voltage and/or a variable current at the output 22 of the motor drive to achieve a desired torque on the drive shaft 110. The polarity, or direction, in which the torque is applied changes between the first torque 152a and the second torque 152b. For illustration purposes, FIG. 6B shows the first torque 152a being applied in a positive direction and the second torque 152b being applied in a negative direction. Although the second torque 152b is illustrated as "ramping down" throughout the third state 164, the magnitude of torque is increasing, but in a negative direction. In other words, the current output to the motor 70 is increased by the motor drive 40 in a manner that results in a linear increase of torque from zero torque at the start of the third state 164 to negative one hundred percent torque and the end of the third state 164, where the negative sign indicates a reversal of direction of the applied torque from the first state 160. It is contemplated that various other methods of increasing the torque, such as periodic step changes or a sinusoidal increase of the torque may be utilized without deviating from the scope of the invention.

The current is generated such that the torque, Trq, increases in the second direction throughout the desired range of magnitudes. The second direction is opposite the first direction and may be, for example, a "negative" or counter-clockwise direction of rotation of the motor shaft 110. The second torque 152b may or may not produce a motion detected by the encoder depending on the force 128 or 132 applied to the hub 102 by the load present on the motor 70. Motion is detected by the position feedback signal 95 which may be, for example, encoder counts representing a motion of the rotor or drive shaft 110 with respect to the brake 60. The amount of motion is limited by the width of the gap 130 between a surface of the tooth 122 and a surface of the groove 126. This motion is indicated by the step change in angular position, θ, from zero to negative Delta, −Δ, in FIG. 6c.

In a fourth state 166 (labeled "4" in FIG. 6D) the brake 60 is still applied and the motor drive 40 decreases the magnitude of the second torque 152b applied to the motor 70. In the illustrated embodiment, the second torque 152b is illustrated as "ramping up" throughout the fourth state 166. However, the magnitude of the torque is decreasing but it is a negative value of torque. Thus, the second torque 152b is changing from a maximum negative value to zero. In other words, the current output to the motor 70 is decreased by the motor drive 40 in a manner that results in a linear decrease of torque from negative one hundred percent torque at the start of the fourth state 166 to zero torque and the end of the fourth state 166. It is contemplated that various other methods of decreasing the torque, such as periodic step changes or a sinusoidal decrease of the torque may be utilized without deviating from the scope of the invention. The second torque 152b is applied for a second duration 153b of the pretorque sequence. Although the second torque 152b is illustrated as ramping from zero torque to negative one hundred percent torque and then ramping back to zero torque, it is contemplated that various other initial and final setpoints of torque may be selected without deviating from the scope of the invention.

Similar to increasing the magnitude of torque in the third state 164, decreasing the magnitude of torque in the fourth state 166 may or may not produce a motion detected by the encoder 80 depending on the force 128 or 132 applied to the hub 102 by the load present on the motor 70. If motion was detected during the initial ramp in the third state 164, this indicates the torque applied was sufficient to overcome the load and that the force applied 128 or 132 was in the direction opposite of the torque applied. As a result, the torque applied during the third state 164 caused the hub 102 to rotate such that the tooth 122 moved from one side of the groove 126 to the other. As the magnitude of torque is ramped back to zero, the force applied 128 or 132 by the load causes the hub 102 to rotate back to its initial position. This motion is detected by the position feedback signal 95 which may be, for example, encoder counts representing a motion of the rotor or drive shaft 110 with respect to the brake 60. The amount of motion is limited by the width of the gap 130 between a surface of the tooth 122 and a surface of the groove 126. This motion is indicated by the step change in angular position, θ, from negative Delta, −Δ, back to zero in FIG. 6c.

During states 1 through 4 (160-166), the feedback signal 95 from the encoder 80 may be monitored to detect motion in the system. The motion corresponds to an angular rotation of the drive shaft 110 in either direction as the torque is increased/decreased. The motor drive 40 may utilize the detected motion to determine both a direction and a magnitude of a desired pretorque level for the motor to apply prior to releasing the brake 60.

The direction of the pretorque is determined as a function of the polarity of the torque that is applied to cause motion of the drive shaft 110 during states 1-4. Although FIG. 6 illustrates motion occurring in either direction and as a function both positive and negative torque, it is noted that FIG. 6c illustrates four different runs where each run is represented by a different line. Along each line, motion occurs responsive only to one of the directions of torque applied in FIG. 6B. With reference to FIG. 5, if force vector 128 is a positive direction, application of additional torque in the positive direction (i.e., states 1 and 2) result in pressing the first side wall 123a of the tooth 122 against the first interior surface 124a of the groove 126 with greater force. However, the brake 60 will resist further movement in that direction and, therefore, little or no movement is detected. In contrast, application of torque in the negative direction (i.e., states 3 and 4) will eventually counteract the vector force 128 and cause the hub 102 to rotate such that the second side wall 123b of the tooth 122 is pressed against the second interior surface 124b of the groove 126. This rotation causes the angular position, $\theta$, in FIG. 6c to move from zero to negative Delta, $-\Delta$. Although not illustrated, if the second side wall 123b of the tooth 122 were initially pressed against the second interior surface 124b of the groove 126 due to the application of a negative force vector 132, the application of positive torque during the first state 160 would cause the angular position, $\theta$, in FIG. 6c to move from zero to Delta, $\Delta$. Thus, the movement resulting from the application of a positive torque determines a first polarity and movement resulting from the application of a negative torque determines a second polarity of pretorque.

The magnitude of the pretorque is determined as a function of the magnitude of torque required to cause motion of the drive shaft 110 during states 1-4. With reference to FIGS. 6b and 6c, the magnitude of pretorque required to hold the load corresponds to the magnitude of torque being applied when the angular position, $\theta$, changes or in other words the magnitude of pretorque required to hold the load corresponds to the magnitude of torque required to cause the hub 102 to move within the grooved rotor plate 104 of the holding brake 60. As discussed in more detail below, the identified level of pretorque is applied in state 6, 170. The levels shown in state 6 170 of FIG. 6B, correspond to the level of torque being applied when movement of the hub 102 is detected by the position feedback signal 95. For, example, the two sample loads demonstrated by the plots exhibiting a change in angular position, $\theta$, during the first two states (160, 162) each illustrate a different loading level on the motor 70. A first plot in FIG. 6c has a wide band at which the angular position, $\theta$, is at Delta, $\Delta$. Tracing the change in angular position, $\theta$, shown in FIG. 6c up to the corresponding level of torque, Trq, illustrated in FIG. 6b, the level of torque required to cause the change in position is relatively low. When the level of torque again drops below the initial level required to cause the first change in angular position, $\theta$, the second change in angular position shows the angular position returning from Delta, $\Delta$, to zero. The second plot in FIG. 6c has a narrower band at which the angular position, $\theta$, is at Delta, $\Delta$, than the first plot. Tracing the change in angular position, $\theta$, shown in FIG. 6c up to the corresponding level of torque, Trq, illustrated in FIG. 6b, the level of torque required to cause the change in position is greater than that required to cause the change for the first plot. When the level of torque again drops below the level required to cause the first change in angular position, $\theta$, the second change in angular position shows the angular position returning from Delta, $\Delta$, to zero.

In the embodiment illustrated in FIG. 6, to detect motion when applying torque in the first direction (i.e., states 160 and 162), the motor drive 40 may ramp up the current and, therefore, the first torque 152a produced by the motor 70 in the first direction from an initial magnitude of about 0% of rated torque on the motor 70 to a final magnitude of about 100% of rated torque. The encoder 80 may initially detect motion at a magnitude of about 20% of rated torque on the motor 70 for the first plot discussed above and at a magnitude of about 80% of rated toque for the second plot discussed above. As a result, the motor drive 40 may determine the correct pre-torque magnitude (20% or 80%) and direction (first direction) for the pre-torque to hold the mechanical load being applied to the motor 70.

Similarly, to detect motion when applying torque in the second direction (i.e., states 164 and 166), the motor drive 40 may ramp up the magnitude of current in the second direction, or in an opposite polarity from the first direction, and, therefore, the second torque 152b is produced by the motor 70 in the second direction. The second torque 152b is illustrated as ramping down to a negative torque, meaning the magnitude of torque changes from an initial magnitude of about 0% of rated torque on the motor 70 to a final magnitude of about 100% of rated torque, but the direction of the second torque 152b is applied opposite the direction of the first torque 152a. The encoder 80 may initially detect motion at a magnitude of about −20% of rated torque on the motor 70 for the third plot shown in FIG. 6c and at a magnitude of about −80% of rated toque for the fourth plot shown in FIG. 6c. As a result, the motor drive 40 may determine the correct pre-torque magnitude (20% or 80%) and direction (second direction) for the pre-torque to hold the mechanical load being applied to the motor 70.

After determining the direction and magnitude of a pretorque required to suspend the mechanical load being applied to the motor 70, the motor drive applies that torque in state 5 168. As shown, in FIG. 6b, the torque is ramped from zero torque to the magnitude and direction of the required pretorque identified in the first four states. When the pretorque reaches the required level, the angular position may again move such that hub 102 rotates within the grooved rotor 104. Optionally, the pretorque level may be selected at a level just prior to motion occurring such that no motion occurs when the pretorque is applied, but also the motor 70 is very nearly at the level of torque required to suspend the load prior to opening the brake 60. Once the pretorque level has been determined and applied to the motor 70, the brake is energized, causing the armature plate 114 to disengage the friction pads 105 on the rotor disk 104, allowing the hub 102 to rotate. By first activating the motor 70 to apply a level of torque in the proper to support the mechanical load applied to the motor 70, a smooth transition from the brake 60 supporting the load to the motor 70 supporting the load occurs.

Referring now to FIG. 8, a state and timing diagram illustrating activation and resulting motion of the motor 70 during an exemplary start of the motor is provided in accordance with an embodiment of the invention. With the brake 60 applied and prior to starting, an initial pre-torque state (labeled "0") is shown. The amount of torque 180 applied by the motor 70 is zero, and the position sensor 80 or encoder detects approximately zero motion with respect to a rotor or drive shaft. Next, still with the brake applied, at the first pre-torque state 160 (labeled "1"), the motor drive ramps-up the amount of torque 152*a* applied by the motor in a first direction through multiple increasing magnitudes. As the amount of torque 152*a* applied by the motor gradually reaches approximately 60%, the position sensor 80 or encoder detects motion. The angular position indicates that the rotor has moved the relative maximum amount, or Delta, Δ, as discussed above, thereby indicating that any greater amount of torque is unnecessary to provide the movement through the gap 130 in the brake 60.

With the brake still applied, the motor drive 40 enters the second pre-torque state 162 (labeled "2"). The motor drive 40 gradually ramps-down the first torque 152*a* applied by the motor through multiple decreasing magnitudes. When the amount of torque applied by the motor 70 reaches approximately 60%, the position sensor or encoder may again capture an amount of motion, indicating the rotor or drive shaft returning to again to its original brake position. The motor drive may later use this data from the encoder from the first state, the second state, or both states (such as to determine an average) for determining a correct pre-torque magnitude for subsequent application.

With the brake still applied, the motor drive 40 enters a third pre-torque state 164 (labeled "3"). The motor drive gradually ramps-up an amount of torque 152*b* applied by the motor in a second direction, opposite the first direction, through multiple increasing magnitudes. When the amount of torque applied by the motor reaches 100%, the position sensor or encoder has detected approximately zero motion with respect to a rotor or drive shaft. The motor drive 40 moves to the fourth pre-torque state 166 (labeled "4") and gradually ramps-down the amount of torque 152*b* applied by the motor through multiple decreasing magnitudes. Through the ramp-down of the second torque 152*b*, the position sensor or encoder captures approximately zero motion. Having completed the first through fourth states, the controller may now determine that a pre-torque magnitude of 60% in the first direction will be sufficient to lift the load from the brake.

With the brake still applied, the motor drive 40 enters a fifth pre-torque state 168 (labeled "5"). The motor drive 40 gradually ramps-up the amount of torque applied by the motor to the correct pre-torque 155 of 60% in the first direction. As the amount of torque applied by the motor gradually reaches approximately 60%, the position sensor or encoder may capture an increasing amount of motion, which motion may again reach a relative maximum. Upon applying the pre-torque, the motor drive 40 enters a sixth pre-torque state 170 (labeled "6") and disengages/releases the brake 60. The motor drive 40 may typically run through the above six states in less than a second. Having now provided a smooth transition from brake to drive with the brake fully disengaged and the motor fully engaged, following the sixth state, the controller may continue with normal operation to carry the load, such as an elevator cab, to a desired position.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A method of determining a desired pretorque level for a motor controlling motion in a counterbalancing system, the motor having a holding brake operatively connected to a drive shaft of the motor, the method comprising the steps of:

increasing a magnitude of current applied to the motor to generate torque in a first direction of rotation while the holding brake is set;

monitoring a position feedback signal corresponding to rotation of the motor while the torque is generated in the first direction;

removing the current applied to the motor to generate torque in the first direction of rotation;

increasing the magnitude of current applied to the motor to generate torque in a second direction of rotation while the holding brake is set;

monitoring the position feedback signal corresponding to rotation of the motor while the torque is generated in the second direction;

removing the current applied to the motor to generate torque in the second direction of rotation; and determining the desired pretorque level as a function of the magnitude of current applied to the motor and a magnitude of rotation detected by the position feedback signal.

2. The method of claim 1 wherein the step of determining the desired pretorque level further comprises the steps of:

comparing a change in the position feedback signal to a first threshold; and setting the desired pretorque level equal to the magnitude of current applied to the motor when the change in the position feedback signal reaches the first threshold.

3. The method of claim 1 wherein the step of determining the desired pretorque level further comprises the steps of:

comparing a change in the position feedback signal to a first threshold;

when the change in the position feedback signal exceeds the first threshold, monitoring the position feedback signal until the change in the position feedback signal drops back below the first threshold; and when the change in the position feedback signal drops back below the first threshold, setting the desired pretorque level equal to the magnitude of current applied to the motor when the change in the position feedback signal drops back below the first threshold.

4. The method of claim 1 further comprising the step of applying a magnitude of current to the motor to generate torque at the desired pretorque level prior to releasing the holding brake.

5. A system for determining a desired pretorque level for a motor controlling motion in a counterbalancing system, the motor having a holding brake operatively connected to a drive shaft of the motor, the system comprising:

a power converter operatively connected to the motor to supply a variable voltage and a variable current to the motor for controlling operation of the motor;

a position feedback device operatively connected to the motor and configured to generate a signal corresponding to an angular position of the motor; and a controller including:

an input operative to receive the signal from the position feedback device;
a memory device operative to store a plurality of instructions; and
a processor operative to execute the plurality of instructions to:
control operation of the power converter to provide an increasing magnitude of current to the motor with a first polarity, wherein the current increases from a first level to a second level and generates a torque in the motor in a first direction of rotation,
monitor the signal from the position feedback device while the increasing magnitude of current with the first polarity is being provided to the motor,
control operation of the power converter to provide a decreasing magnitude of current with the first polarity to the motor, wherein the current decreases from the second level to the first level,
control operation of the power converter to provide an increasing magnitude of current to the motor with a second polarity, wherein the current increases from the first level to a third level, the second polarity is opposite the first polarity, and the current generates a torque in the motor in a second direction of rotation,
monitor the signal from the position feedback device while the increasing magnitude of current with the second polarity is being provided to the motor,
control operation of the power converter to provide a decreasing magnitude of current with the second polarity to the motor, wherein the current decreases from the third level to the first level, and
determine the desired pretorque level as a function of the magnitude of current applied to the motor and a magnitude of rotation detected by the position feedback signal.

6. The system of claim 5 further comprising a motor drive wherein the power converter is a power conversion section of the motor drive and the controller is a control section of the motor drive.

7. The system of claim 5 wherein the desired pretorque level is determined as a function of the magnitude of current applied to the motor as the current is increasing in magnitude.

8. The system of claim 7 wherein the processor is further operative to:
compare a change in the signal from the position feedback device to a first threshold, and
set the desired pretorque level equal to the magnitude of current applied to the motor when the change in the signal from the position feedback device reaches the first threshold.

9. The system of claim 5 wherein the desired pretorque level is determined as a function of the magnitude of current applied to the motor as the current is decreasing in magnitude.

10. The system of claim 9 wherein the processor is further operative to:
compare a change in the signal from the position feedback device to a first threshold,
when the change in the signal from the position feedback device exceeds the first threshold, monitor the signal from the position feedback device until the change in the signal drops back below the first threshold, and
when the change in the signal from the position feedback device drops back below the first threshold, set the desired pretorque level equal to the magnitude of current applied to the motor when the change in the signal from the position feedback device drops back below the first threshold.

11. The system of claim 5 wherein the processor is further operative to control operation of the power converter to provide
a magnitude of current to the motor to generate torque at the desired pretorque level prior to releasing the holding brake.

12. A method of reducing rollback for a motor controlling motion in a counterbalancing system, the motor having a holding brake operatively connected to a drive shaft of the motor, and the rollback occurring when the brake is opened, the method comprising the steps of:
while the holding brake is set:
activating the motor to apply a first torque to the drive shaft in a first direction;
monitoring a position feedback signal corresponding to rotation of the drive shaft while the first torque is being applied;
activating the motor to apply a second torque to the drive shaft in a second direction;
monitoring the position feedback signal corresponding to rotation of the drive shaft while the second torque is being applied;
determining a magnitude and direction of a desired pretorque level as a function of the applied first and second torque and of the position feedback signal;
activating the motor to apply a torque at the desired pretorque level to the drive shaft; and
releasing the holding brake.

13. The method of claim 12 wherein a motor drive supplies a variable voltage and a variable current to the motor to apply each torque to the drive shaft and wherein the motor drive receives the position feedback signal and generates a control signal to release the holding brake.

14. The method of claim 12 wherein the step of activating the motor to apply the first torque further comprises the steps of:
incrementally changing a magnitude of current applied to the motor to generate the first torque from a first level to a second level; and
removing the current applied to the motor to generate the first torque.

15. The method of claim 14 wherein the desired pretorque level is determined as a function of the magnitude of current applied to the drive shaft.

16. The method of claim 15 wherein the step of determining the magnitude and direction of the desired pretorque level further comprises the steps of:
comparing a change in the position feedback signal to a first threshold; and
setting the desired pretorque level equal to a level of torque resulting from the magnitude of current being applied to the motor when the change in the position feedback signal reaches the first threshold.

17. The method of claim 15 wherein the step of determining the magnitude and direction of the desired pretorque level further comprises the steps of:
comparing a change in the position feedback signal to a first threshold;
when the change the position feedback signal exceeds the first threshold, monitor the position feedback signal until the change in the position feedback signal drops back below the first threshold; and
when the change in the position feedback signal drops back below the first threshold, set the desired pretorque level equal to a level of torque resulting from the magnitude of current being applied to the motor when the change in the position feedback signal drops back below the first threshold.

18. The method of claim 12 wherein the step of activating the motor to apply the second torque further comprises the steps of:
   incrementally changing a magnitude of current applied to the motor to generate the second torque from a third level to a fourth level; and
   removing the current applied to the motor to generate the second torque, wherein the desired pretorque level is determined as a function of the magnitude of current applied to the drive shaft.

19. The method of claim 18 wherein the step of determining the magnitude and direction of the desired pretorque level further comprises the steps of:
   comparing a change in the position feedback signal to a first threshold; and
   setting the desired pretorque level equal to a level of torque resulting from the magnitude of current being applied to the motor when the change in the position feedback signal reaches the first threshold.

20. The method of claim 18 wherein the step of determining the magnitude and direction of the desired pretorque level further comprises the steps of:
   comparing a change in the position feedback signal to a first threshold;
   when the change the position feedback signal exceeds the first threshold, monitor the position feedback signal until the change in the position feedback signal drops back below the first threshold; and
   when the change in the position feedback signal drops back below the first threshold, set the desired pretorque level equal to a level of torque resulting from the magnitude of current being applied to the motor when the change in the position feedback signal drops back below the first threshold.

* * * * *